(12) United States Patent
Alotaibi

(10) Patent No.: US 8,862,136 B2
(45) Date of Patent: Oct. 14, 2014

(54) SYSTEM AND METHOD FOR MAKING OUTGOING CALLS AT REDUCED COST

(71) Applicant: Husain K. Alotaibi, Rabiya (KW)

(72) Inventor: Husain K. Alotaibi, Rabiya (KW)

(*) Notice: Subject to any disclaimer, the term of this patent is extended or adjusted under 35 U.S.C. 154(b) by 0 days.

(21) Appl. No.: 13/894,393

(22) Filed: May 14, 2013

(65) Prior Publication Data

US 2013/0252592 A1    Sep. 26, 2013

Related U.S. Application Data

(63) Continuation-in-part of application No. 13/726,974, filed on Dec. 26, 2012, and a continuation of application No. 13/044,710, filed on Mar. 10, 2011, now abandoned.

(51) Int. Cl.
| | |
|---|---|
| *H04W 40/00* | (2009.01) |
| *H04M 15/00* | (2006.01) |
| *H04W 76/04* | (2009.01) |
| *H04M 3/42* | (2006.01) |
| *H04W 4/24* | (2009.01) |

(52) U.S. Cl.
CPC .......... *H04W 76/04* (2013.01); *H04M 15/8083* (2013.01); *H04M 3/42195* (2013.01); *H04M 15/8044* (2013.01); *H04W 4/24* (2013.01)
USPC .......................... 455/445; 455/406; 455/552.1

(58) Field of Classification Search
USPC ........... 455/405–409, 414.1, 415, 445, 552.1, 455/553.1, 426.1, 436–444; 379/114.15–141
See application file for complete search history.

(56) References Cited

U.S. PATENT DOCUMENTS

| | | | |
|---|---|---|---|
| 5,027,387 A * | 6/1991 | Moll | 379/115.02 |
| 5,077,682 A | 12/1991 | Kim | |
| 5,299,258 A | 3/1994 | Tsumura et al. | |
| 5,706,330 A | 1/1998 | Bufferd et al. | |
| 6,154,532 A * | 11/2000 | Lockhart et al. | 379/143 |
| 6,445,921 B1 * | 9/2002 | Bell | 455/426.1 |
| 6,999,572 B1 * | 2/2006 | Shaffer et al. | 379/210.01 |
| 7,406,307 B2 | 7/2008 | Manto | |
| 7,613,471 B2 | 11/2009 | Lee et al. | |
| 2003/0129963 A1 | 7/2003 | Nurcahya | |
| 2007/0054659 A1 * | 3/2007 | Chou et al. | 455/417 |
| 2007/0201646 A1 | 8/2007 | Metcalf | |
| 2008/0085746 A1 * | 4/2008 | Ray et al. | 455/575.1 |
| 2008/0101567 A1 * | 5/2008 | Baudino et al. | 379/114.01 |
| 2009/0170503 A1 * | 7/2009 | Luo et al. | 455/426.1 |
| 2010/0291928 A1 * | 11/2010 | Valdez | 455/436 |

* cited by examiner

*Primary Examiner* — Daniel Lai
(74) *Attorney, Agent, or Firm* — Richard C Litman

(57) ABSTRACT

In order to reduce service fees associated with placing "out of area" or international wireless telephone calls, the method of making outgoing calls at reduced cost provides switching between wireless service (such as cellular telephone service or the like) and conventional, wired (or, "landline") service. A first telephone call is initiated from a first, wireless telephone to a second telephone. A telephone number associated with the first telephone is recorded by a caller ID system or the like, and the first telephone call is disconnected. A second, wired telephone call is then initiated from the second telephone to the first telephone using the recorded telephone number. A third, wired telephone call is then initiated, from the first telephone to the second telephone.

5 Claims, 5 Drawing Sheets

SYSTEM AND METHOD FOR MAKING OUTGOING CALLS AT REDUCED COST

CROSS-REFERENCE TO RELATED APPLICATION

This application is a continuation-in-part of U.S. patent application Ser. No. 13/726,974, filed Dec. 26, 2012, which is a continuation of U.S. patent application Ser. No. 13/044,710, filed Mar. 10, 2011, now abandoned.

BACKGROUND OF THE INVENTION

1. Field of the Invention

The present invention relates to the field of telephony, and particularly to a system and method for making outgoing calls at reduced cost that provides for switching between wireless and wired telephone transmissions in order to reduce service costs to the user.

2. Description of the Related Art

The use of cellular phones has been expanding at an exponential rate and has grown to the extent that more and more businessmen, and even school children, carry a cellular phone and use them extensively. However, it is also true that in some businesses, the cost of cellular phone use is a growing concern, and efforts are being made to reduce such costs.

The existence of "charge lines" and "non-charge lines" is well known and has been addressed in U.S. Pat. No. 5,299,258, issued to Tsumura et al. As disclosed therein, an information input/output controller for telephone lines converts information input from either a charge line or a non-charge line to data form, and then stores it in a memory device along with identification data specifying the type of line on which the information was received. It also reads information from the memory device in response to information read requests received by way either of a charge line or of a non-charge line, and when called upon to output the information either to a charge line or to a non-line, it inhibits the output of the information to a non-charge line in cases where the line indicated by the aforementioned identification data on the line and the line on which the information read request, if received, are both non-charge lines. This enables either the sending party or the receiving party of a service, but not both, to be charged for the service, while at the same time ensuring that, if the sending party and the receiving party of the service both use a non-charge line, the output of the information will be inhibited in order to preserve the integrity of the charging function. Moreover, if the line indicated by the identification data and the line on which the read request is received are both charge lines, a message is sent to the issuer of the read request to indicate the availability of a non-charge line. This prevents the sending party and the receiving party of the same service from being charged for the service.

U.S. Pat. No. 5,706,330, issued to of Buffered et al., discloses a method and apparatus for tracking and transmitting communication information for wireless communication systems. As disclosed, a communication accounting system is provided wherein the transfer of call detail record information from a remotely located phone may be accomplished in an efficient manner. During non-billable processes or during airtime billed at a reduced rate, the call detail record (CDR) information from the previous registration is simultaneously sent to the collector system for processing to the billing system. More specifically, encrypted and compressed authorization information and call details records (CDRs) from the previous use of the phone are simultaneously communicated from the Cellular Call Computer—Programmable Off-line (C3PO) to the host computer system by modem or other suitable manner. At the validation server, the authorization information is decrypted and uncompressed and stripped away from the CDRs while the call is live, and sent to an authorization service. While the validation system is working on completing the authorization, the system is uploading the CDRs from calls made since the last authorization attempt. These CDRs are stored for later processing. The invention also provides a roaming management system integrated with the accounting system. By the method, disclosed equipment is efficiently utilized, internal airtime charges are minimized, and customers are billed in a timely manner.

Further, U.S. Pat. No. 7,406,307, issued to Manto, discloses a system and method for providing interoperable and on-demand telecommunications service. The system relates in general to the field of voice and data communications, and in particular, to a novel system for providing interoperable on-demand communications and services across otherwise incompatible narrowband voice and broadband systems. The system is also based on sponsored or universal communications services supported by interactive communications between sponsors and service providers and their respective databases of business rules.

Additionally, U.S. Pat. No. 7,613,471, issued to Lee et al., discloses a method of providing SMS callback. The patent discloses a method of connecting two or more phone lines in a cross-country connection through a rented device. The device may be a mobile phone or a SIM card. A SMS message is sent from the rented device to a service provider bearing the identification of the phone lines to be connected. The SMS is received by a gateway of the service provider, and the gateway subsequently places calls to the phone lines in the SMS and connects the phone lines. Each of these patents is hereby incorporated by reference in its entirety.

As indicated above, in many cases, it is more expensive to make telephone calls using a cellular phone than to make the same call over a conventional land line. This is particularly true with respect to long distance calls, and even more particularly to international calls. In some other cases, some calls can be made without charge with a land-based line, while calls using a cellular phone may incur a charge. Thus, it is believed that there is a need and a potential commercial market for a device that will allow a cellular phone user to make calls over a land-based line.

Thus, a system and method for making outgoing calls at reduced cost solving the aforementioned problems is desired.

SUMMARY OF THE INVENTION

In order to reduce service fees associated with placing "out of area" or international wireless telephone calls, the system and method for making outgoing calls at reduced cost provides switching between wireless service (such as cellular telephone service or the like) and conventional, wired (or, "landline") service. A first telephone call is initiated from a first, wireless telephone to a second telephone, which may be a landline telephone. A telephone number associated with the first telephone is recorded by a caller ID system or the like, and the first telephone call is disconnected. A second, wired telephone call is then initiated from the second telephone to the first telephone using the recorded telephone number. A third, wired telephone call is then initiated, from the first telephone to the second telephone. The third, wired telephone call may be made through a third landline telephone in communication with the first telephone via a switch, router or the like, or the first telephone may include both wired and wireless telephone transceivers integrated into a single unit.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 3:
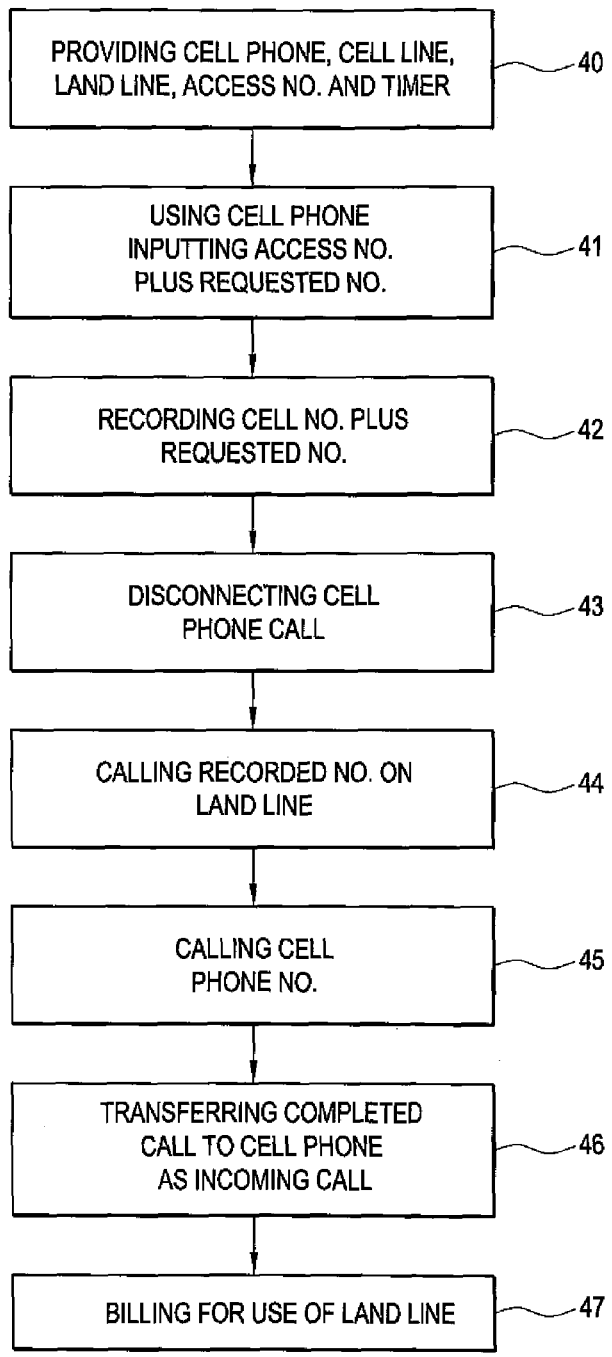
FIG. 3 is a flowchart illustrating method steps of the system and method for making outgoing calls at reduced cost of FIG. 1.
Figure 5:
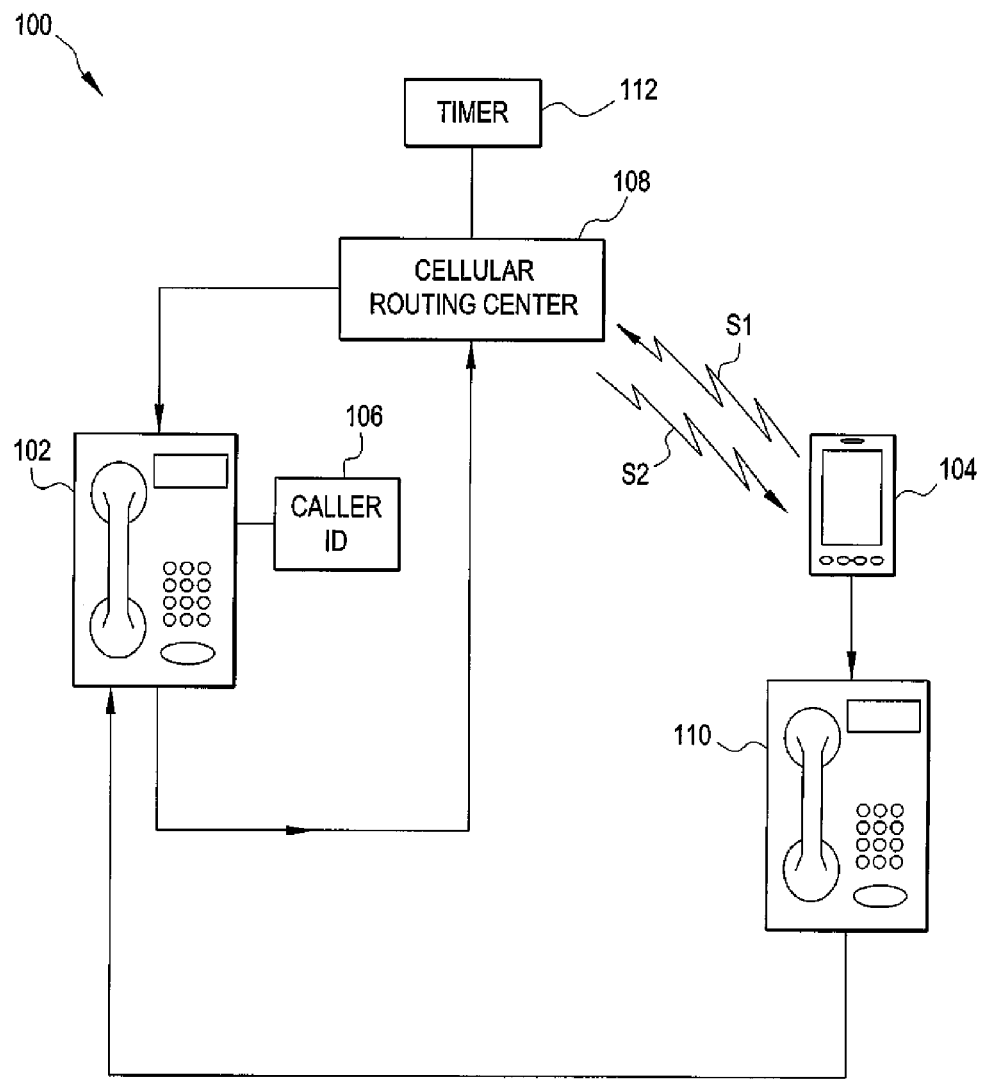
FIG. 5 is a block diagram illustrating the system for making outgoing calls at reduced cost according to the present invention.

As illustrated in FIG. 5, a system 100 for making outgoing calls at reduced cost is used to receive a call at telephone 102 from a cellular telephone 104, mobile telephone or the like. Telephone 102, which may be a conventional "landline" telephone or the like, is equipped with a caller ID system 106, or any other suitable means for recording the telephone number of the cellular telephone 104. The cellular telephone 104, a routing center 108, a timer 112, an authentication code for accessing the system and the landlines are established at step 40 in FIG. 3.

When the initial call is made from the cellular telephone 104 (step 41 in FIG. 3), including entry of the access code, a wireless signal S1 is transmitted to the cellular routing center 108, which receives the wireless signal S1, connects to telephone 102 through a conventional landline or the like, and transmits the call from the cellular telephone 104 to the telephone 102 through the landline. In the system 100, as soon as the connection is made, the telephone number of the cellular telephone 104 is recorded by the caller ID system 106 (step 42), and the call is immediately disconnected (step 43).

Using the recorded telephone number, a landline call is placed from the telephone 102 to the cellular telephone 104 (step 44), which receives the call (step 45). This call is routed through the cellular routing center 108, which transmits a signal S2 to the cellular telephone 104 (step 46). Many cellular telephone calling plans charge the user for calls made from the cellular telephone, but not for calls received by the cellular telephone. The system 100 allows the user of the cellular telephone 104 to minimize charges by initiating a telephone call to the landline telephone 102 and then immediately disconnecting the call as soon as the caller ID system 106 records the telephone number of the cellular telephone 104. The user of the cellular telephone 104 is only charged for this very brief call before the disconnection, and for any landline charges that may apply at the reduced landline call rate (step 47). Then, the call is reinitiated, but by the telephone 102 calling back the cellular telephone 104.

For service plans in which the cellular telephone 104 is charged for wirelessly receiving a call, particularly when the cellular telephone 104 is located beyond a designated service area, the system 100 may transmit a recorded message to the cellular telephone 104 via signal S2, telling the user of the cellular telephone 104 to call back on a landline telephone 110 to further reduce costs. The user of the cellular telephone 104 reduces costs by only being charged for placing a long distance or international telephone call via a landline telephone 110.

Preferably, as noted above, in order to make use of the system 100, the user of the cellular telephone 104 must enter an access code via the keypad of the cellular telephone 104, or use some other form of authentication, authorization or identification. Once the landline telephone 102 has called back the cellular telephone 104, the system 100 records the duration of the telephone call via the timer 112 or the like for billing purposes, in a manner consistent with conventional telephone billing.

Figure 1:
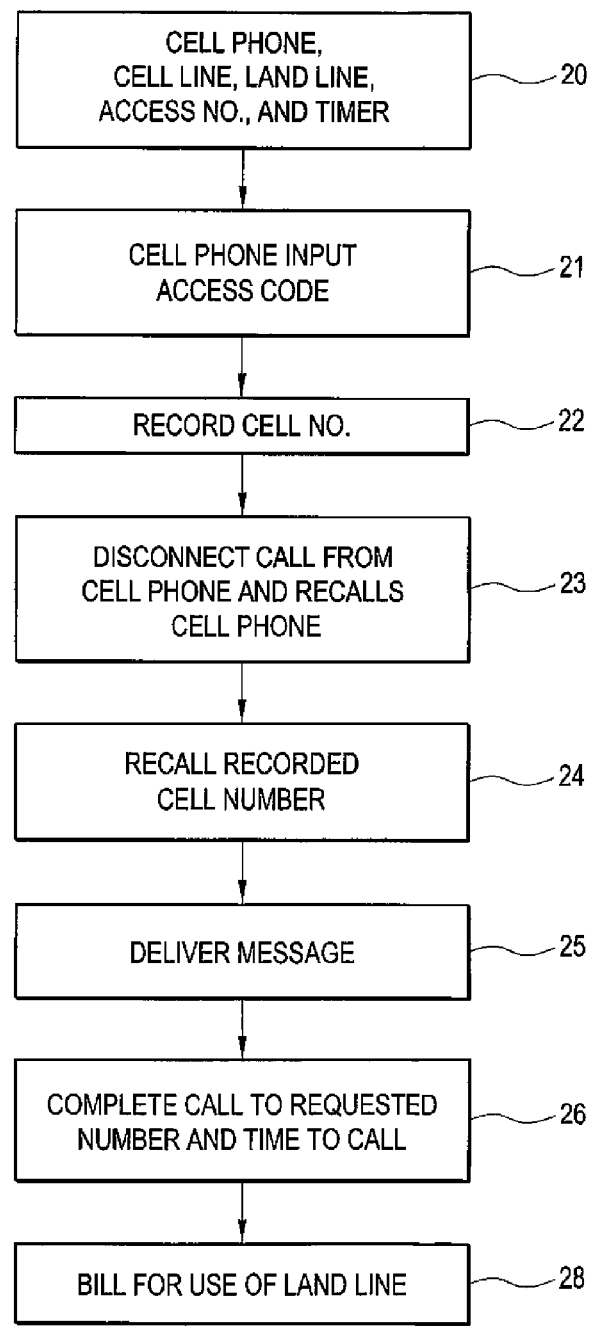
FIG. 1 is a block diagram illustrating an overview of a system and method for making outgoing calls at reduced cost according to the present invention.

In FIG. 1, the cellular telephone 104, routing center 108, timer 112, authentication code and the landlines are established at step 20. As noted above, use of the landline has a lower billing rate than that of the wireless cellular system. At step 21, the cellular telephone 104 is used to dial an access code or the like to gain access to the system 100. The system 100 is used to circumvent higher cellular rates, particularly for "out of service area" or international calls, by making use of the lower rates of a conventional landline telephone system.

Once access to the system 100 has been gained, the user dials the telephone number of telephone 102. The telephone number of the cellular telephone 104 is recorded by the caller ID system 106 associated with the telephone 102 (step 22). The system then immediately disconnects the call from the cellular telephone at step 23, and recalls the recorded number of the cellular telephone at step 24.

At this point, a conventional telephone call may be initiated, using the land line to connect between the calling telephone 102 and the cellular telephone 104. However, as noted above, for calling plans in which the cellular telephone user will still be charged for receiving the phone call, instead of initiating a conventional phone call, a prerecorded message may be delivered to the cellular telephone user to redial the telephone number of the telephone 102 using a separate landline telephone 110 (step 25). The call is then placed via conventional telephone 110 to telephone 102, the call being timed for billing purposes, as is well known in telephone billing systems and methods (step 26). The user is then billed at step 28, as is conventionally known. Preferably, the cellular telephone 104 and the landline 110 are interconnected or integrated into a single unit. This allows the unit to be used as a switch. Once the prerecorded message has been received by the cellular telephone 104, the call is automatically switched/routed through the landline 110. This allows the user of the cellular telephone 104 to remain on the line, without disconnecting, while the call is automatically switched/routed from the cellular telephone 104 through the landline 110. The wireless transmission S2 is terminated once the switching has been performed, thus keeping the user of the cellular telephone 104 continuously on the line, but switched from wireless signal S2 to a landline signal routed through landline 110.

Figure 2:
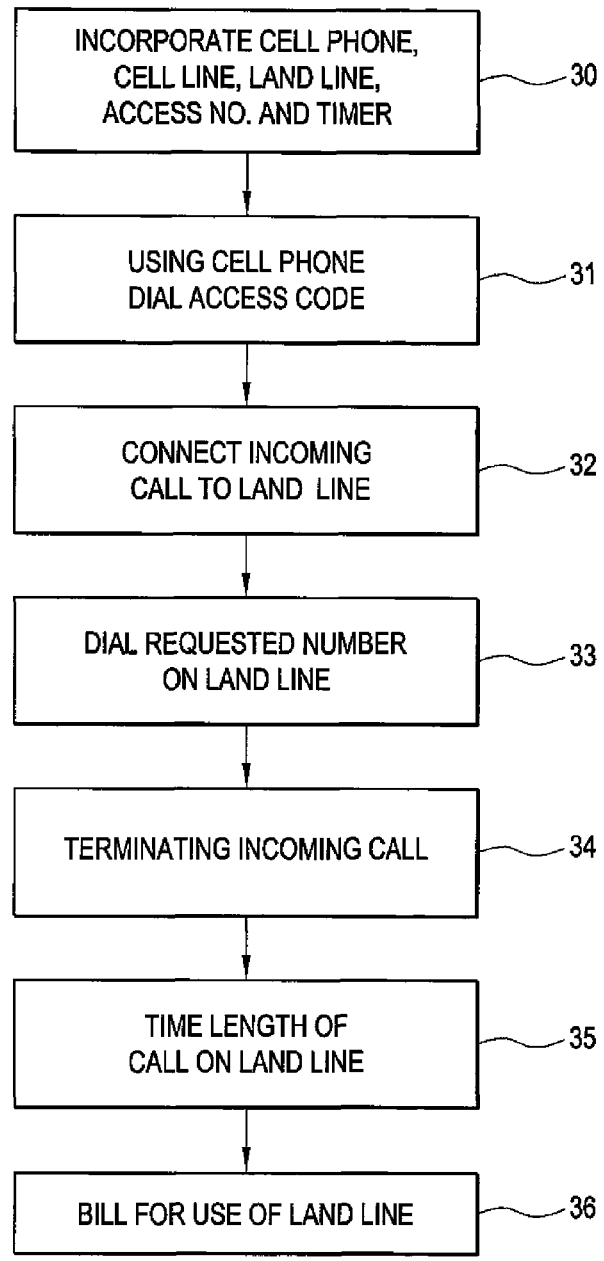
FIG. 2 is a block diagram illustrating an overview of an alternative embodiment of a system and method for making outgoing calls at reduced cost according to the present invention.

In the alternative embodiment of FIG. 2, the cellular telephone 104, routing center 108, timer 112, authentication code and the landlines are established at step 30. To gain access to the system, the access code is entered by the cellular telephone user at step 31. In this embodiment, the routing center 108 connects the cellular telephone 104 to a landline at step 32, and then the user enters the telephone number of telephone 102 (which may be out of the user's service area) at step 33, with the call then being initiated. In this embodiment, the system 100, to which the user subscribes, only charges the user of cellular telephone 104 for the usage of the landline. Timer 112 records the length of the call at step 34, as is conventionally known, and the user of the cellular telephone is billed solely for the usage of the landline (step 35).

Figure 4:
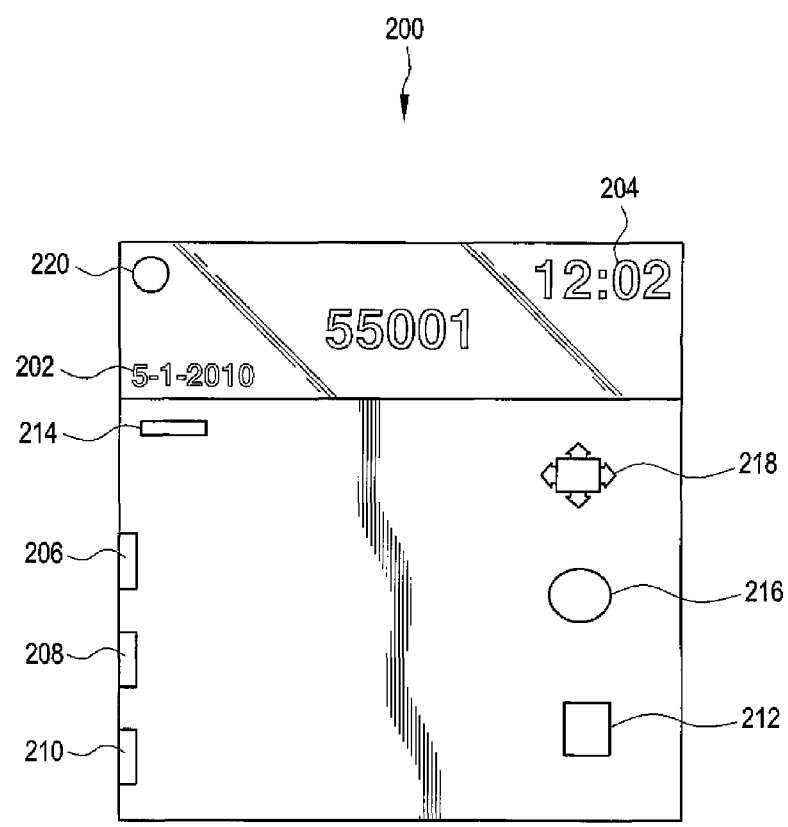
FIG. 4 is an exemplary screenshot illustrating operation of the system and method for making outgoing calls at reduced cost according to the present invention.

FIG. 4 illustrates an exemplary screen display 200, which may be displayed to the user on cellular telephone 104 and/or on the caller ID system 106. As shown, display 200 includes an indication of the date 202, the time 204, and indicators 206, 208 for showing whether the cellular line or the landline is in use, respectively. For operating and/or accessing the system 100, a power button 210 and an on/off switch 212 may further be provided. A further visual indicator 214 may be provided to indicate that the cellular telephone 104 is in a receiving mode. Cellular telephone 104 may further be provided with a positioning key 218 for memory and information control, along with a generalized key or interface 216. Further, indicator 214 may be used to indicate that the telephone 104 is powered. An alarm signal or light 220 may be further provided to indicate that all available lines are busy.

It is to be understood that the present invention is not limited to the embodiment described above, but encompasses any and all embodiments within the scope of the following claims.

I claim:

1. A method for making outgoing calls at reduced cost, comprising the steps of:
    initiating a first telephone call from a first telephone to a second telephone;
    recording a telephone number associated with the first telephone; disconnecting the first telephone call;
    initiating a second telephone call from the second telephone to the first telephone using the recorded telephone number;
    in response to determining calling plans in which the first telephone being charged for receiving phone call, transmitting a prerecorded message via the second telephone call from a system serving the second telephone to the first telephone to call the second telephone via a third telephone;
    initiating a third telephone call from the third telephone to the second telephone; and
    switching the first telephone of the second telephone call to the third telephone of the third telephone call, wherein the third telephone is in communication with the first telephone, the third telephone call being routed from the first telephone through the third telephone to the second telephone;
    wherein the first telephone is a mobile telephone and the third telephone is a landline telephone.

2. The method for making outgoing calls at reduced cost as recited in claim 1, wherein the step of initiating the first telephone call comprises:
    entering an access code; and
    entering a telephone number of the second telephone.

3. A method for making outgoing calls at reduced cost, comprising the steps of:
    initiating a first, wireless telephone call from a first telephone to a second telephone;
    recording a telephone number associated with the first telephone;
    disconnecting the first telephone call;
    initiating a second, wired telephone call from the second telephone to the first telephone using the recorded telephone number;
    in response to determining calling plans in which the first telephone being charged for receiving phone call, transmitting a prerecorded message via the second telephone call to the first telephone to call the second telephone via a third telephone; and
    initiating a third, wired telephone call from the first telephone to the second telephone in response to reception of the prerecorded message at the first telephone;
    wherein the step of initiating a third, wired telephone call includes selectively and automatically switching and routing the first telephone call through the third telephone.

4. The method for making outgoing calls at reduced cost as recited in claim 3, wherein the step of initiating the first, wireless telephone call comprises:
    entering an access code; and
    entering a telephone number of the second telephone.

5. A method for making outgoing calls at reduced cost, consisting of the steps of:
    initiating a first telephone call from a mobile telephone to a second telephone by entering an access code, and entering a telephone number of the second telephone;
    recording a telephone number at the second telephone associated with the mobile telephone;
    disconnecting the first telephone call between the mobile telephone and the second telephone;
    initiating a second telephone call from the second telephone to the mobile telephone using the recorded telephone number;
    transmitting a prerecorded message from a system serving the second telephone to the mobile telephone in response to determining calling plans in which the first telephone being charged for receiving phone call;
    initiating a third telephone call from a landline telephone to the second telephone in response to reception of the prerecorded message at the first telephone; and
    wherein the mobile telephone of the second telephone call is selectively and automatically switched to the landline telephone of the third telephone call;
    terminating the second telephone call between the second telephone and the mobile telephone upon completion of switching the second telephone call to the landline telephone of the third telephone call;
    wherein the landline telephone is in communication with the mobile telephone;
    whereby the third telephone call is routed from the mobile telephone through landline telephone to the second telephone so that the costs associated with the landline telephone are substantially less than the costs that would have been associated with the mobile telephone.

* * * * *